US011822922B2

(12) United States Patent
Karve et al.

(10) Patent No.: US 11,822,922 B2
(45) Date of Patent: Nov. 21, 2023

(54) MISS-DRIVEN INSTRUCTION PREFETCHING (71) Applicant: International Business Machines Corporation, Armonk, NY (US)

(72) Inventors: Mohit Karve, Austin, TX (US); Naga P. Gorti, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/566,744

(22) Filed: Dec. 31, 2021

(65) Prior Publication Data
US 2023/0214221 A1   Jul. 6, 2023

(51) Int. Cl.
*G06F 9/38*   (2018.01)
*G06F 12/08*   (2016.01)
*G06F 12/0862*   (2016.01)

(52) U.S. Cl.
CPC ........ *G06F 9/3802* (2013.01); *G06F 12/0862* (2013.01); *G06F 2212/602* (2013.01)

(58) Field of Classification Search
None
See application file for complete search history.

(56) References Cited

U.S. PATENT DOCUMENTS

| | | | |
|---|---|---|---|
| 5,958,040 A | 9/1999 | Jouppi | |
| 5,961,629 A | 10/1999 | Nguyen | |
| 7,085,915 B1 | 8/2006 | St. John | |
| 8,099,556 B2 * | 1/2012 | Ghosh | G06F 9/383 |
| | | | 711/141 |
| 8,738,860 B1 | 5/2014 | Griffin | |
| 8,856,452 B2 | 10/2014 | Sun | |
| 9,280,474 B2 | 3/2016 | Demos | |
| 9,378,021 B2 * | 6/2016 | Chishti | G06F 9/3802 |
| 9,811,341 B2 | 11/2017 | Stavrou | |
| 10,102,134 B2 * | 10/2018 | Chishti | G06F 9/383 |
| 10,606,750 B1 | 3/2020 | Mattina | |
| 10,782,973 B2 | 9/2020 | Bertolli | |
| 2001/0001873 A1 | 5/2001 | Wickeraad | |
| 2003/0208665 A1 * | 11/2003 | Peir | G06F 12/0859 |
| | | | 712/E9.05 |
| 2007/0288697 A1 | 12/2007 | Keltcher | |
| 2008/0034187 A1 | 2/2008 | Stempel et al. | |
| 2009/0031082 A1 * | 1/2009 | Ford | G06F 12/0864 |
| | | | 711/216 |
| 2009/0222625 A1 * | 9/2009 | Ghosh | G06F 12/0802 |
| | | | 711/3 |

(Continued)

FOREIGN PATENT DOCUMENTS

| | | |
|---|---|---|
| CN | 102968294 A | 12/2002 |
| CN | 114721726 A | 7/2022 |

OTHER PUBLICATIONS

Batcher, Kenneth W., "Cache Miss Reduction Techniques for Embedded CPU Instruction Caches", May 2008, Dissertation, in the Non-Final Office Action for U.S. Appl. No. 16/929,208, dated Jul. 13, 2022, 134 pages (Year: 2008).

(Continued)

*Primary Examiner* — Steven G Snyder
(74) *Attorney, Agent, or Firm* — Daniel M. Yeates (57) ABSTRACT

A processor may initialize a fetch of a first instruction. The processor may determine whether there is an icache miss for the first instruction. The processor may fetch the next instruction from a cache.

15 Claims, 6 Drawing Sheets

(56) References Cited

U.S. PATENT DOCUMENTS

| | | | |
|---|---|---|---|
| 2011/0119426 | A1 | 5/2011 | Boyle et al. |
| 2011/0219208 | A1 | 9/2011 | Asaad et al. |
| 2012/0311270 | A1 | 12/2012 | Sun |
| 2012/0324142 | A1 | 12/2012 | Boyle et al. |
| 2015/0234663 | A1* | 8/2015 | Chishti ................ G06F 9/3808 712/207 |
| 2016/0299847 | A1* | 10/2016 | Chishti ................ G06F 9/3808 |
| 2016/0335087 | A1 | 11/2016 | Bertolli |
| 2020/0310817 | A1 | 10/2020 | Cook |
| 2020/0387381 | A1* | 12/2020 | Karve .................... G06F 9/383 |
| 2021/0303468 | A1* | 9/2021 | Kallurkar ............ G06F 11/3037 |
| 2022/0019440 | A1 | 1/2022 | Gorti et al. |
| 2022/0129385 | A1* | 4/2022 | Karve ................ G06F 12/0862 |
| 2023/0195464 | A1* | 6/2023 | Nori ..................... G06F 9/3806 712/207 |

OTHER PUBLICATIONS

Disclosed Anonymously, "Mechanism to Decrease Cold Cache Startup Effects in Instruction Cache Prefetching", IP.com No. IPCOM000248538D, IP.com Electronic Publication Date: Dec. 14, 2016, An IP.com Prior Art Database Technical Disclosure, 7 pages.

Disclosed Anonymously, "Method and System for Providing a Single-Entry Instruction Effective-To-Real Address Translator (IERAT) for Power Efficiency and Timing", IP.com No. IPCOM000257687D, IP.com Electronic Publication Date: Mar. 2, 2019, An IP.com Prior Art Database Technical Disclosure, 3 pages.

Disclosed Anonymously, "Simultaneous Data Prefetch Request Probing and Recycled Data Forwarding from a Load Store Unit", IP.com No. IPCOM000221102D, IP.com Electronic Publication Date: Aug. 29, 2012, An IP.com Prior Art Database Technical Disclosure, 7 pages.

Ebrahimi et al., "Techniques for Bandwidth-Efficient Prefetching of Linked Data Structures in Hybrid Prefetching Systems", Conference Paper, IEEE Xplore, Mar. 2009, 11 pages.

Guo et al., "Energy-Efficient Hardware Data Prefetching", IEEE Transactions on Very Large Scale Integration (VLSI) Systems, vol. 19, No. 2, Feb. 2011, 14 pages.

IBM, Appendix P, List of IBM Patents or Patent Applications Treated as Related, 2 pages, dated Aug. 1, 2022.

Spracklen et al., "Effective Instruction Prefetching in Chip Multiprocessors for Modern Commercial Applications", Conference Paper, Mar. 2005, Research Gate, 13 pages.

Anonymous. "Mechanism to Decrease Cold Cache Startup Effects in Instruction Cache Prefetching." Published Dec. 14, 2016. 7 pages. Published by IP.com. htttps://ip.com/IPCOM/000248538.

Anonymous. "Method and Apparatus for Early Fetch Redirection in a computer processor." Published Nov. 20, 2012. 6 pages. Published by IP.com. https://ip.com/IPCOM/000223643.

Crainiceanu, Adina, "Bloofi: A Hierarchical Bloom Filter Index with Applications to Distributed Data Provenance." Published Aug. 26, 13. 8 pages. In Cloud-I '13.Published by ACM. Riva del Garda, Trento, Italy.

Ghosh, et al., "Way guard: A segmented counting bloom filter approach to reducing energy for set-associative caches." Conference Paper Published Jan. 2009 by Research Gate. 7 pages. In Proceedings of the International Symposium on Low Power Electronics and Design, Aug. 19-21, 2009. San Francisco, Ca, USA. https://www.researchgate.net/publication/220846848.

Mell, et al., "The NIST Definition of Cloud Computing," Recommendations of the National Institute of Standards and Technology, U.S. Department of Commerce, Special Publication 800-145, Sep. 2011, 7 pgs.

Nikas, et al., "An Adaptive Bloom Filter Cache Partitioning Scheme for Multicore Architectures." Conference Paper Published Aug. 2008 by Research Gate. 9 pages. In Embedded Computer Systems: Architectures, Modeling, and Simulation, 2008. SAMOS 2008. https://www.researchgate.net/publication/224345769.

Peir, et al,; "Bloom Filtering Cache Misses for Accurate Data Speculation and Prefetching." ICS'02, Jun. 22-26, 2002, New York, New York, USA. 10 pages.

\* cited by examiner

MISS-DRIVEN INSTRUCTION PREFETCHING

BACKGROUND

The present disclosure relates generally to the field of instruction prefetching, and more specifically to miss-driven instruction prefetching.

Some implementations of instruction prefetching are triggered purely on instruction cache (Icache) misses (e.g., due to power and timing complexity issues). This results in a pattern of reactive behavior where a miss is first observed, then prefetched on the second pass, and there is a miss again on the next pass if the trigger cache line was not a miss.

SUMMARY

Embodiments of the present disclosure include a method, computer program product, and system for miss-driven instruction prefetching. A processor may initialize a fetch of a first instruction. The processor may determine whether there is an icache miss for the first instruction. The processor may fetch the next instruction from a cache.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of instruction prefetching, and more specifically to miss-driven instruction prefetching. While the present disclosure is not necessarily limited to such applications, various aspects of the disclosure may be appreciated through a discussion of various examples using this context.

In some embodiments, prior icache misses may be identified, and this information may be used to trigger a miss-driven instruction prefetcher in a modern microprocessor, regardless of whether the request actually hit or missed in the instruction cache. In some embodiments, prior misses may be tracked in a bloom filter. In some embodiments, future icache accesses may check the bloom filter, and in case of a hit in the bloom filter, that access may be treated like a miss from the perspective of the instruction prefetcher.

In some embodiments, a processor may initialize a fetch of a first instruction. In some embodiments, the processor may determine whether there is an icache miss for the first instruction. In some embodiments, the processor may fetch the next instruction. In some embodiments, the first instruction and the next instruction may be non-sequential instructions. For example, a processor, based on one instruction, may prefetch (e.g., access information, cache, etc.) another instruction. The other instruction may be associated with the first instruction and not directly be in the instruction sequence of the first instruction. If there is a miss in accessing the other instruction, the processor may prefetch the next, non-sequential instruction.

In some embodiments, determining whether there is the icache miss for the first instruction may include identifying that there is an icache miss for the first instruction. In some embodiments, determining whether there is the icache miss for the first instruction may include requesting a line from a next cache/memory. In some embodiments, determining whether there is the icache miss for the first instruction may include beginning an instruction prefetch of the next instruction.

In some embodiments, determining whether there is the icache miss for the first instruction may include identifying that there is an icache match for the first instruction. In some embodiments, the processor may determine that there is a bloom filter match for the first instruction.

In some embodiments, determining that there is a bloom filter match for the first instruction may include identifying a bloom filter match for the first instruction. In some embodiments, determining that there is a bloom filter match for the first instruction may include beginning an instruction prefetch.

In some embodiments, determining whether there is the icache miss for the first instruction may include identifying that there is an icache match for the first instruction. In some embodiments, the processor may determine that there is a bloom filter miss for the first instruction.

In some embodiments, the bloom filter may include one or more identification indices showing when an instruction should be prefetched. In some embodiments, demand misses may be tracked by a bloom filter. In some embodiments, the filter may be a large (1 k-8 k bits) table that is indexed by a hash of the instruction cache line address that missed the cache. In some embodiments, the cache addresses A1, B1, C1 . . . Z1 may all be reduced to a 10-13 bit hash and set the target bit in the table. In some embodiments, on every future Instruction Cache access, this filter may be consulted, and if the bit is set, the access may be identified as a prior demand miss (still triggering instruction prefetching). In some embodiments, this may filter out sequential accesses and also any state machine code outside the loop that does remain resident in the instruction cache.

In some embodiments, the bloom filter may be an untagged table. In some embodiments, the bloom filter may be prone to aliasing. In some embodiments, the bloom filter may need to be managed by occasional or periodic clearing of the whole table, or probabilistic clearing of random entries every time a timer runs out. In some embodiments, the bloom filter may allow for tracking of a very large number of instruction lines. In some embodiments, a typical instruction cache may be in the range of 32-64 KB, containing 256-512 lines. In some embodiments, a 1 KB bloom filter may be able to map approximate history for 8K cache lines (8K entries×1 bit for each entry), allowing the bloom filter to easily retain information across multiple cache-line lifetimes.

Figure 1:
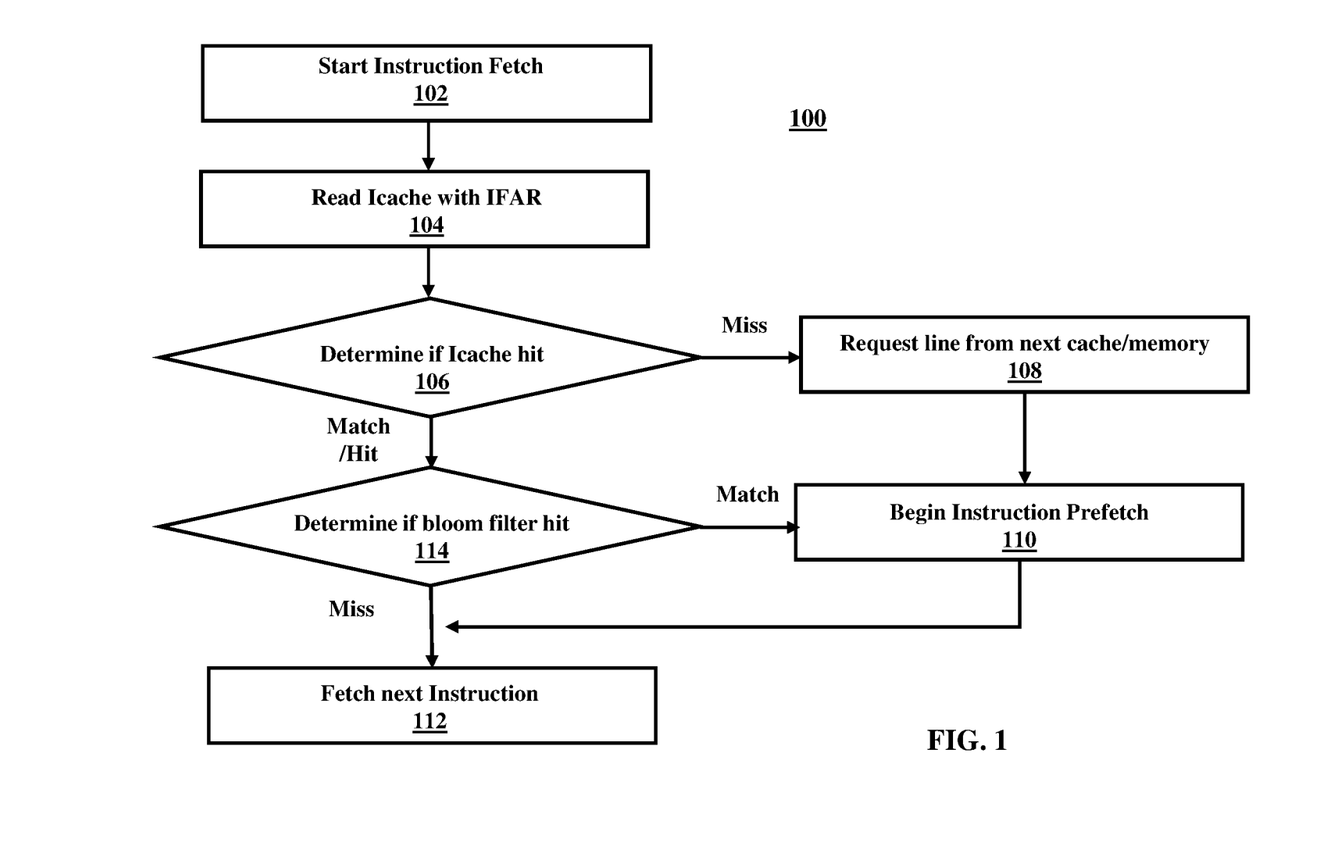
FIG. 1 illustrates a flowchart of an example method for miss-driven instruction prefetching, in accordance with aspects of the present disclosure.

Referring now to FIG. 1, illustrated is a flowchart of an example method 100 for miss-driven instruction prefetching, in accordance with aspects of the present disclosure. In some embodiments, the method 100 may be performed by a processor (e.g., of system 250 of FIG. 2B).

In some embodiments, the method 100 begins at operation 102, where the processor initializes a fetch of a first instruction. In some embodiments, method 100 proceeds to operation 104, where the processor reads the icache with an instruction fetch address register ("IFAR"). In some embodiments, method 100 proceeds to decision block 106. At decision block 106, the processor determines whether there is an icache miss for the first instruction. In some embodiments, method 100 proceeds to operation 108, if the processor determines that there was an icache miss. At operation 108, the processor requests a line from the next cache/memory. In some embodiments, method 100 proceeds to operation 110, where the processor begins the instruction prefetch for the next instruction. In some embodiments, method 100 proceeds to operation 112. At operation 112, the processor fetches the next instruction.

In some embodiments, if the processor determines that there was an icache match at decision block 106, method 100 proceeds to decision block 114. At decision block 114, the processor determines whether there is a bloom filter match for the first instruction. In some embodiments, if there is a bloom filter match, method 100 proceeds to operation 110, where the processor begins the instruction prefetch. In some embodiments, method 100 proceeds to operation 112, where the processor fetches the next instruction. In some embodiments, if there is no bloom filter match (decision block 114), method 100 proceeds to operation 112, where the processor fetches the next instruction.

As discussed in more detail herein, it is contemplated that some or all of the operations of the method 100 may be performed in alternative orders or may not be performed at all; furthermore, multiple operations may occur at the same time or as an internal part of a larger process.

Figure 2A:
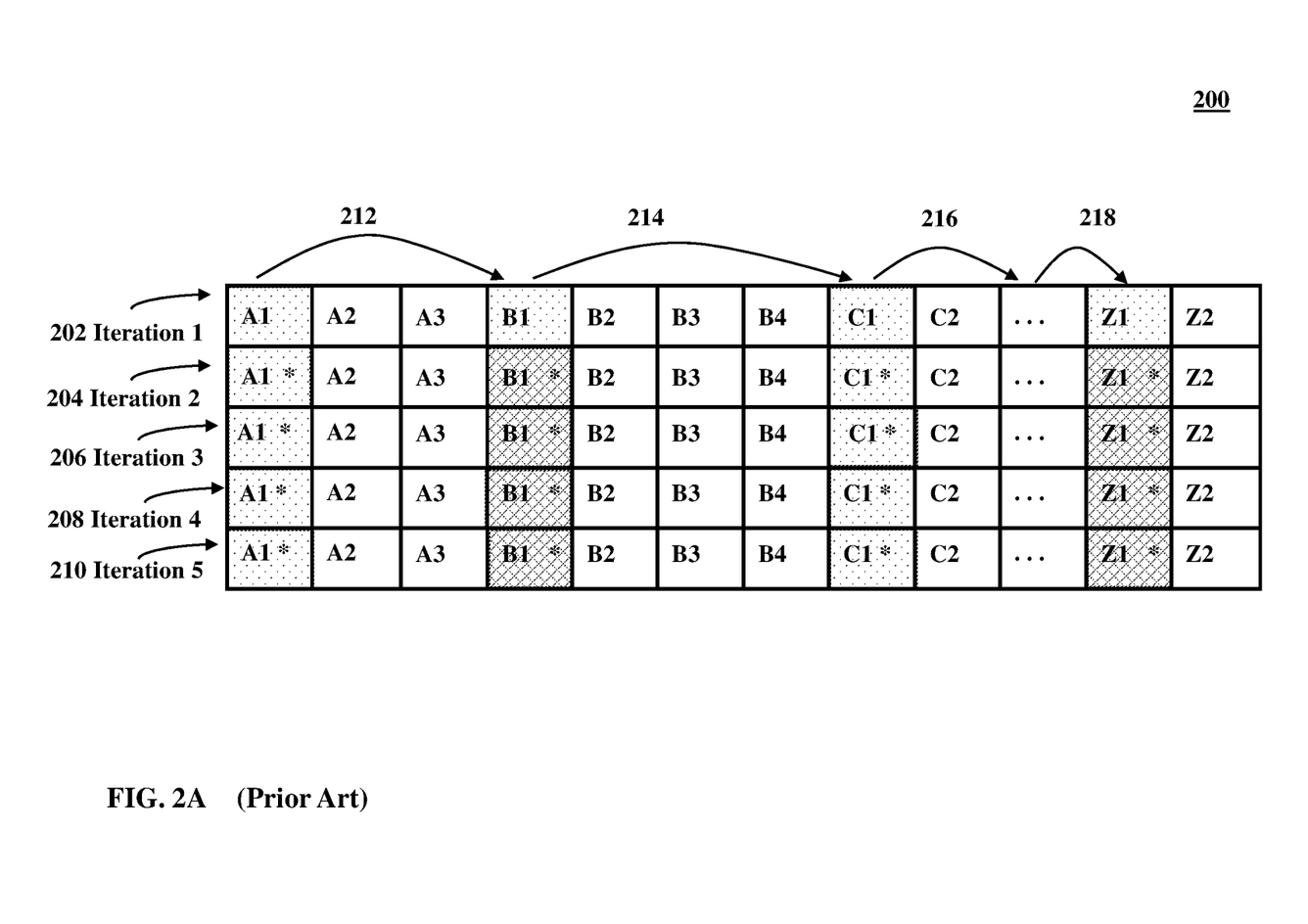
FIG. 2A illustrates a block diagram of prefetching of instructions by a prefetcher.

Referring now to FIG. 2A, illustrated is prefetching of instructions (instructions 200) by a prefetcher. The prefetcher prefetches the next cache line in the sequence if there was a prior icache miss in the iteration of instruction fetching (e.g., a reactive prefetching). The prefetcher additionally knows the order of sequential cache lines (e.g., the prefetcher has instructions to retrieve cache line A2 after cache line A1). Illustrated are five iterations (202 to 210) of instruction fetching. Boxes A1, A2, A3, B1, B2, B3, B4, C1, C2, Z1, Z2, etc. are cache lines (e.g., memory for fast retrieval). Boxes A1, A2, A3 . . . (as well as B1, B2, B3, B4 and C1, C2, and Z1, Z2, etc.) are sequential cache lines (e.g., sequential in terms of addresses where the instructions are stored in memory) that need to be retrieved from memory.

The sequence of cache line transitions from boxes A1 to B1, B1 to C1, and C1 to Z1, etc. are non-contiguous instruction sequences. The prefetcher needs to learn that fetching A1 is a trigger for targeting B1 for fetching, fetching C1 is a trigger for targeting D1 (not illustrated) for fetching, fetching E1 (not illustrated) is a trigger for targeting F1 (not illustrated), etc. The arrows (212 to 218) show the learning of the pattern A1→B1→C1→ . . . →Z1→A1. The cache is rolled by the time the pattern loops from Z2 to A1 (e.g., no lines survive in the cache over a full A1-Z2 loop). Boxes shaded in dotted pattern are icache misses. Boxes shaded in a diamond pattern are icache hits. The boxes with a star indicate that a prefetch request was made (e.g., icache miss and history available).

On the first iteration (e.g., the learning iteration), the prefetcher learns that a miss for A1 precedes a miss for B1, which precedes a miss for C1, etc. In some embodiments, IFAR may include the instruction address of the first instructions fetched in a block of instructions. In some embodiments, when the processor requests one instruction to be fetched from cache, the cache supplies N number of instructions based on the block size of the cache. This avoids reading the cache once for every instruction which will be slow and power hungry. For example, when the processor detects that it needs instruction at address A1, it sends the IFAR A1 to the cache and the cache supplies 4-8 instructions back to the processor.

On the second iteration, where misses trigger prefetches, the miss to A1 triggers a prefetch for B1, and the sequential lines B2, B3, and B4 are fetched). During the second iteration, B1 is not an icache miss. Because B1 was an icache hit, instruction C1 was not prefetched. If C1 is an icache miss (as is illustrated), the next non-sequential successor instruction D1 (not illustrated) will be prefetched. As D1 is an icache hit, its non-sequential successor will not be prefetched. This creates a pattern of intermittent instruction prefetching, with intermittent icache misses (e.g., A1, C1, E1 (not illustrated), etc. are icache misses and were not themselves prefetched). The pattern repeats during iterations 3 through 5 (206 to 210) and no amount of learning in the prefetcher resolves the problem. Further, because none of the cache lines survive one full iteration of the program loop, it is not feasible to store any learning in the icache itself.

Figure 2B:
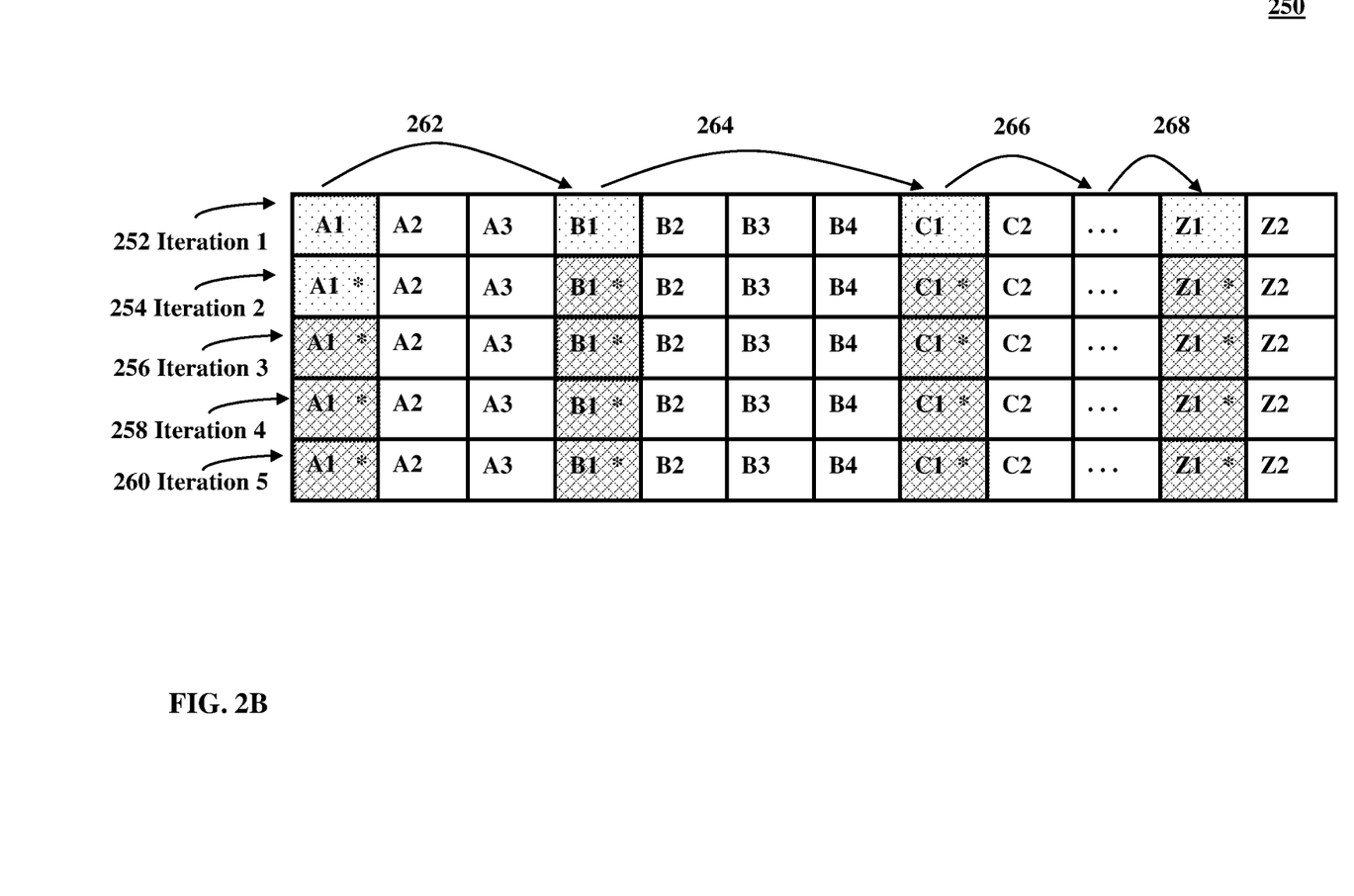
FIG. 2B illustrates a block diagram of prefetching of instructions by an updated prefetcher, in accordance with aspects of the present disclosure.

Referring now to FIG. 2B, illustrated is a prefetching of instructions (instructions 250) by an updated prefetcher. The updated prefetcher stores prior icache misses (e.g., from any iteration) in a bloom filter. When an instruction is fetched, even if there is an icache hit/match, if the instruction is an instruction that was previously saved in the bloom filter, then the prefetcher will prefetch the next instruction (e.g., proactive prefetching). The prefetcher additionally knows the order of sequential instructions (e.g., the prefetcher has instructions to retrieve instruction A2 after instruction A1). Illustrated are five iterations (252 to 260) of instruction fetching. Boxes A1, A2, A3, B1, B2, B3, B4, C1, C2, Z1, Z2, etc. are cache lines. Boxes A1, A2, A3 . . . (as well as B1, B2, B3, B4 and C1, C2, and Z1, Z2, etc.) are sequential cache lines (e.g., sequential in terms of addresses where the instructions are stored in memory) that need to be retrieved from memory. The sequence of instructions from boxes A1 to B1, B1 to C1, and C1 to Z1, etc. are non-contiguous instruction sequences. The prefetcher needs to learn that fetching A1 is a trigger for targeting B1 for fetching, fetching C1 is a trigger for targeting D1 (not illustrated) for fetching, fetching E1 (not illustrated) is a trigger for targeting F1 (not illustrated), etc. The processor needs to learn the sequence for instructions that need to be retrieved from memory. The arrows (262 to 268) show the learning of the pattern A1→B1→C1→ . . . →Z1→A1. The cache is rolled by the time the pattern loops from Z2 to A1 (e.g., no lines survive in the cache over a full A1-Z2 loop). Boxes shaded in a dotted pattern are icache misses. Boxes shaded in a diamond pattern are icache hits. The boxes with stars indicate that a prefetch request was made (e.g., icache miss seen or assumed (e.g., from prior iterations and stored in bloom filter) and history is available).

On the first iteration (e.g., the learning iteration), the prefetcher learns that a miss for A1 precedes a miss for B1, which precedes a miss for C1, etc. On the second iteration, the miss to A1 triggers a prefetch for B1, and the sequential instructions B2, B3, and B4 are fetched (e.g., the processor knows to retrieve sequential instructions). During the second iteration. B1 is not an icache miss. Because B1 was previously (in iteration 1) an icache miss (and this information is stored in the bloom filter), instruction C1 is prefetched. Regardless of whether the previous non-sequential instruction was a hit or a miss. Z1 is prefetched because it was an icache miss in the first iteration. In iteration 3, instruction A1 is prefetched because A1 was an icache miss in iteration 1 and this information is stored in the bloom filter. The pattern repeats during iterations 4 and 5 (258 to 260).

In proactive prefetching, speculative prefetches can be generated on Icache hits/misses all the time. This is power hungry and can lead to a lot of traffic, but will cover for any future misses to the best of the prefetcher's ability. A reactive prefetcher waits for a miss to happen and then covers up future misses based on current miss information. The present disclosure includes reactive prefetching but with justified proactive prefetching based on tracking long term history of cache misses.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3A:
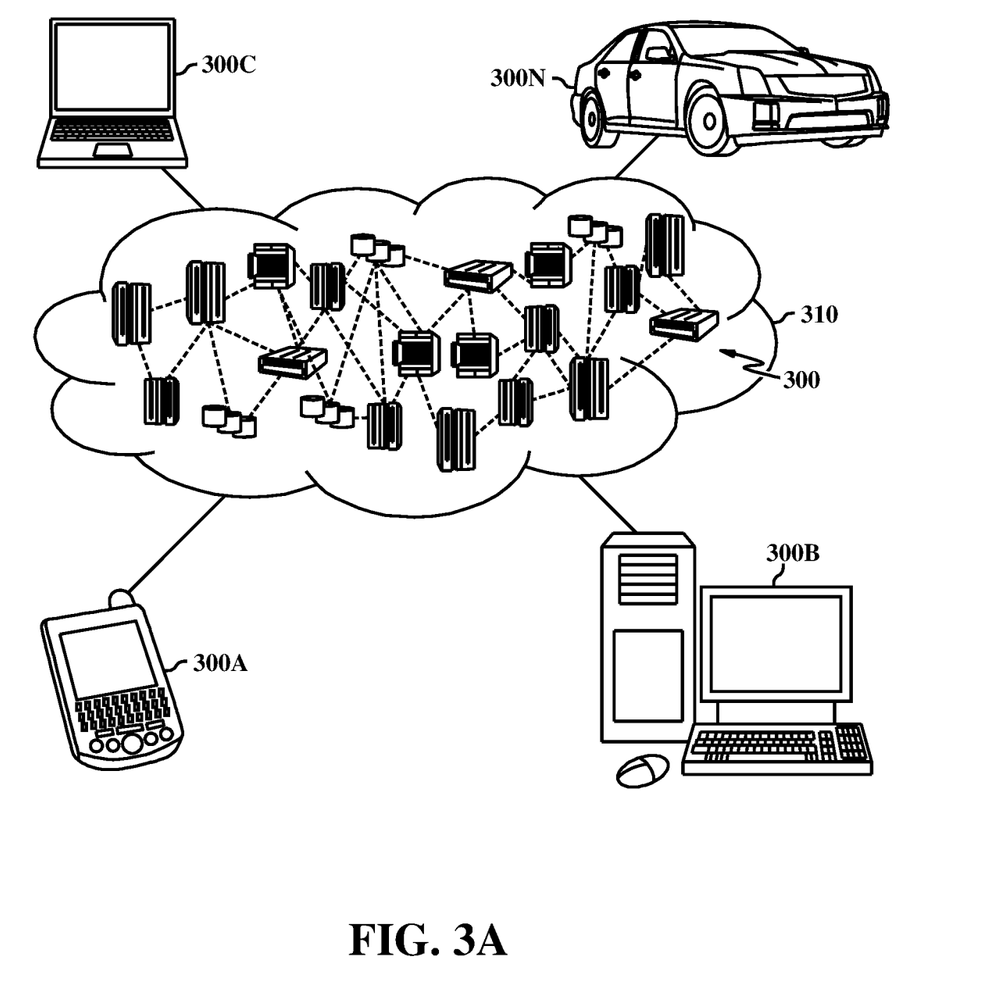
FIG. 3A illustrates a cloud computing environment, in accordance with aspects of the present disclosure.

FIG. 3A, illustrated is a cloud computing environment 310 is depicted. As shown, cloud computing environment 310 includes one or more cloud computing nodes 300 with which local computing devices used by cloud consumers, such as, for example, personal digital assistant (PDA) or cellular telephone 300A, desktop computer 300B, laptop computer 300C, and/or automobile computer system 300N may communicate. Nodes 300 may communicate with one another. They may be grouped (not shown) physically or virtually, in one or more networks, such as Private, Community, Public, or Hybrid clouds as described hereinabove, or a combination thereof.

This allows cloud computing environment 310 to offer infrastructure, platforms and/or software as services for which a cloud consumer does not need to maintain resources on a local computing device. It is understood that the types of computing devices 300A-N shown in FIG. 3A are intended to be illustrative only and that computing nodes 300 and cloud computing environment 310 can communicate with any type of computerized device over any type of network and/or network addressable connection (e.g., using a web browser).

Figure 3B:
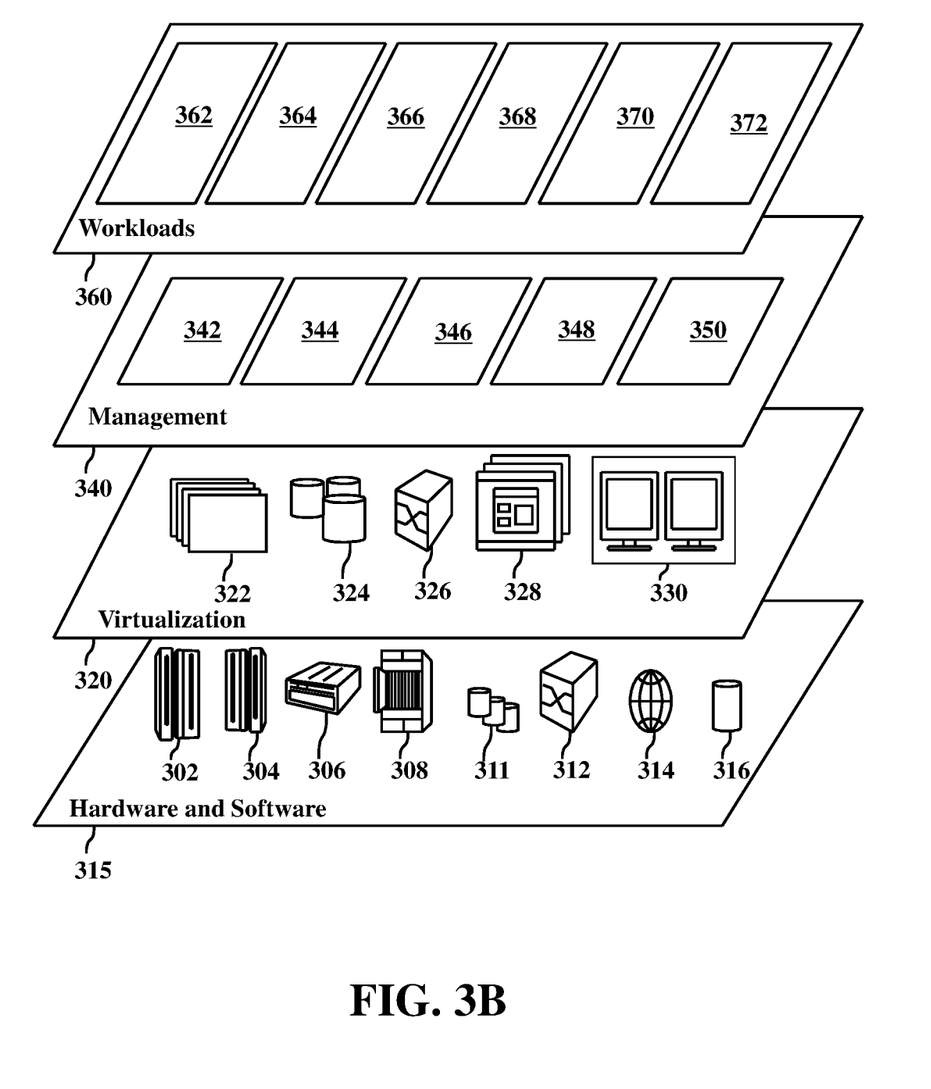
FIG. 3B illustrates abstraction model layers, in accordance with aspects of the present disclosure.

FIG. 3B, illustrated is a set of functional abstraction layers provided by cloud computing environment 310 (FIG. 3A) is shown. It should be understood in advance that the components, layers, and functions shown in FIG. 3B are intended to be illustrative only and embodiments of the disclosure are not limited thereto. As depicted below, the following layers and corresponding functions are provided.

Hardware and software layer 315 includes hardware and software components. Examples of hardware components include: mainframes 302; RISC (Reduced Instruction Set Computer) architecture based servers 304; servers 306; blade servers 308; storage devices 311; and networks and networking components 312. In some embodiments, software components include network application server software 314 and database software 316.

Virtualization layer 320 provides an abstraction layer from which the following examples of virtual entities may be provided: virtual servers 322; virtual storage 324; virtual networks 326, including virtual private networks; virtual applications and operating systems 328; and virtual clients 330.

In one example, management layer 340 may provide the functions described below. Resource provisioning 342 provides dynamic procurement of computing resources and other resources that are utilized to perform tasks within the cloud computing environment. Metering and Pricing 344 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 346 provides access to the cloud computing environment for consumers and system administrators. Service level management 348 provides cloud computing resource allocation and management such that required service levels are met. Service Level Agreement (SLA) planning and fulfillment 350 provide pre-arrangement for, and procurement of, cloud computing resources for which a future requirement is anticipated in accordance with an SLA.

Workloads layer 360 provides examples of functionality for which the cloud computing environment may be utilized. Examples of workloads and functions which may be provided from this layer include: mapping and navigation 362; software development and lifecycle management 364; virtual classroom education delivery 366; data analytics processing 368; transaction processing 370; and miss-driven instruction prefetching 372.

Figure 4:
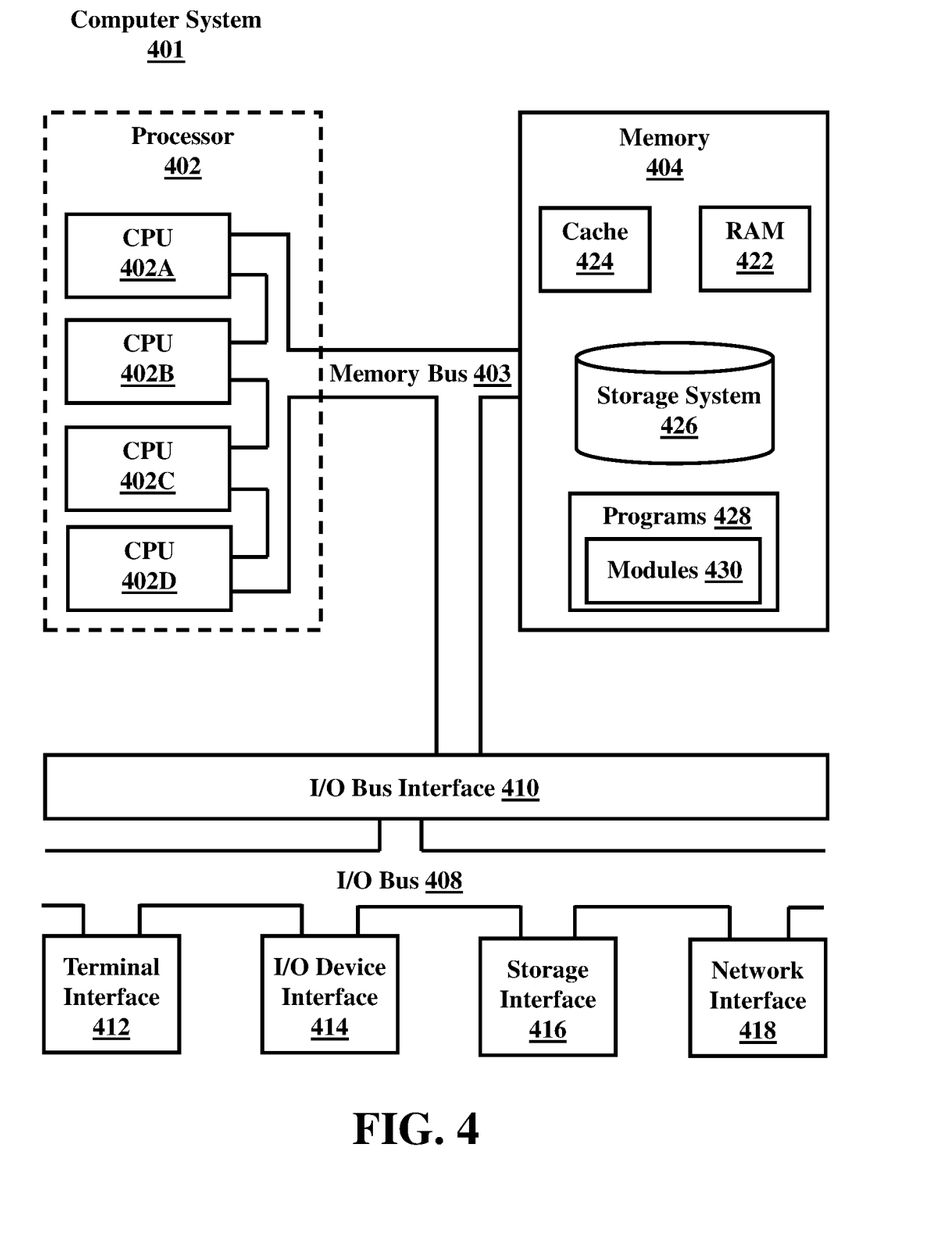
FIG. 4 illustrates a high-level block diagram of an example computer system that may be used in implementing one or more of the methods, tools, and modules, and any related functions, described herein, in accordance with aspects of the present disclosure.

FIG. 4, illustrated is a high-level block diagram of an example computer system 401 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smartphone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method for miss-driven instruction prefetching, the method comprising:
    initializing, by a processor, a fetch of a first instruction;
    determining whether there is an icache hit for the first instruction;
    fetching a next instruction from a cache, wherein the next instruction is sequential to the first instruction;
    determining, in response to determining the icache hit for the first instruction, that there is a bloom filter match for the first instruction, wherein the bloom filter is configured to maintain miss data for at least one icache lifetime; and
    beginning, in response to the determining that there is a bloom filter match, an instruction prefetch for a second instruction, wherein the second instruction is non-sequential to the first instruction.

2. The method of claim 1, further comprising:
    identifying, in a second iteration, that there is an icache miss for the first instruction;
    requesting a line from a next cache; and
    beginning a second instruction prefetch of the next instruction on the second iteration.

3. The method of claim 1, wherein determining whether there is the icache hit for the first instruction includes:
    identifying that there is an icache match for the first instruction; and
    determining that there is a bloom filter miss for the first instruction.

4. The method of claim 1, wherein the bloom filter is an untagged table.

5. The method of claim 4, wherein the bloom filter includes one or more identification indices showing when an instruction should be prefetched.

6. A system for inventory replenishment planning, the system comprising:
    a memory; and
    a processor in communication with the memory, the processor being configured to perform operations comprising:
        initializing a fetch of a first instruction;
        determining whether there is an icache hit for the first instruction;
        fetching a next instruction from a cache, wherein the next instruction is sequential to the first instruction;
        determining, in response to determining the icache hit for the first instruction, that there is a bloom filter match for the first instruction, wherein the bloom filter is configured to maintain miss data for at least one icache lifetime; and
        beginning, in response to the determining that there is a bloom filter match, an instruction prefetch for a second instruction, wherein the second instruction is non-sequential to the first instruction.

7. The system of claim 6, wherein the processor is further configured to perform operations comprising:
    identifying, in a second iteration, that there is an icache miss for the first instruction;
    requesting a line from a next cache; and
    beginning a second instruction prefetch of the next instruction on the second iteration.

8. The system of claim 6, wherein determining whether there is the icache hit for the first instruction includes:
    identifying that there is an icache match for the first instruction; and
    determining that there is a bloom filter miss for the first instruction.

9. The system of claim 6, wherein the bloom filter is an untagged table.

10. The system of claim 6, wherein the bloom filter includes one or more identification indices showing when an instruction should be prefetched.

11. A computer program product for comprising a computer readable storage medium having program instructions embodied therewith, the program instructions executable by a processor to cause the processor to perform operations, the operations comprising:
    initializing a fetch of a first instruction;
    determining whether there is an icache hit for the first instruction;
    fetching a next instruction from a cache, wherein the next instruction is sequential to the first instruction;
    determining, in response to determining the icache hit for the first instruction, that there is a bloom filter match for the first instruction, wherein the bloom filter is configured to maintain miss data for at least one icache lifetime; and
    beginning, in response to the determining that there is a bloom filter match, an instruction prefetch for a second instruction, wherein the second instruction is nonsequential to the first instruction.

12. The computer program product of claim 11, wherein the processor is further configured to perform operations comprising:
   identifying, in a second iteration, that there is an icache miss for the first instruction;
   requesting a line from a next cache; and
   beginning a second instruction prefetch of the next instruction on the second iteration.

13. The computer program product of claim 11, wherein determining whether there is the icache hit for the first instruction includes:
   identifying that there is an icache match for the first instruction; and
   determining that there is a bloom filter miss for the first instruction.

14. The computer program product of claim 11, wherein the bloom filter is an untagged table.

15. The method of claim 1, wherein the first instruction is added to the bloom filter in response to, during a previous iteration, a previous icache miss and a previous bloom filter miss.

* * * * *